Patented July 17, 1951

2,560,617

UNITED STATES PATENT OFFICE 2,560,617

CONDENSATION OF DIHALOALKYLAMINO-BENZOATES WITH AMINOHYDROXY-PYRIMIDINE

David I. Weisblat and Barney J. Magerlein, Kalamazoo, Mich., assignors to The Upjohn Company, Kalamazoo, Mich., a corporation of Michigan No Drawing. Application July 31, 1948,
Serial No. 41,886

14 Claims. (Cl. 260—251.5)

This invention relates to a method for preparing N-((2-amino-4-hydroxy-6-pteridyl)methyl)-p-aminobenzoate compounds, particularly to a method for preparing such compounds related closely to the group of substances commonly referred to as "folic acids," and to intermediates useful therein.

Compounds which can be prepared by the method of the invention are the N-((2-amino-4-hydroxy-6-pteridyl)methyl)-p-aminobenzoate compounds having the general formula

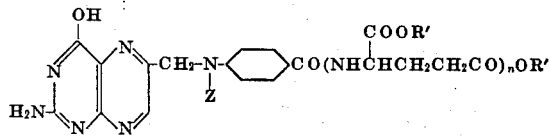

wherein R' is from the group consisting of hydrogen and the alkyl radicals, Z is from the group consisting of hydrogen and the arylsulfonyl radicals and $n$ is from the group consisting of zero and the positive integers 1 to 7, inclusive.

In the naming of compounds of the invention and of compounds related thereto when both a glutamic acid residue and a p-aminobenzoic acid residue are included in the molecule, the nitrogen atom of the glutamic acid residue is, for convenience, herein referred to by the symbol "N'" and the nitrogen atom of the p-amino- benzoic acid residue is referred to by the symbol "N." As indicated by the formula given, compounds containing more than one glutamic acid or ester residue contemplated by the invention are those wherein only the gamma-carboxyl groups are involved in the peptide linkages.

Certain of the N - ((2 - amino - 4-hydroxy-6-pteridyl)methyl) - p - aminobenzoate compounds prepared by the method of the invention appear to be identical with certain compounds of the group referred to broadly in the art as "folic acids" which have been isolated from natural sources. Thus N'-(N-((2-amino-4-hydroxy-6-pteridyl)methyl) - p - aminobenzoyl) - glutamic acid (pteroylglutamic acid) wherein the glutamic acid residue has the same configuration as l(+)-glutamic acid appears to be identical with the so-called "L. casei factor" or vitamin Bc isolated from liver. Other compounds of the same general nature, but having two or more glutamic acid residues connected through the gamma-carboxyl groups which can be prepared by the method given, appear to be identical with and to have the same biological activity of still other members of the folic acid group. The value of methods for preparing these and related compounds synthetically is apparent.

The reactions involved in the method of the invention are indicated in the accompanying diagram.

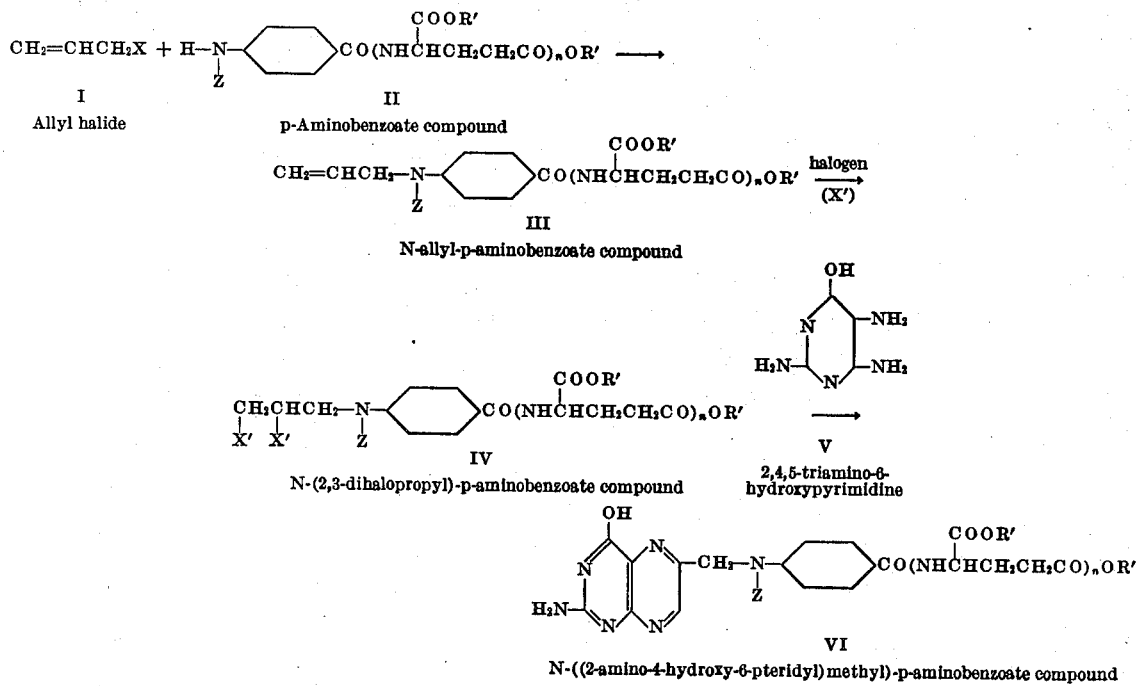

According to the method of the invention an allyl halide, i. e. allyl chloride, bromide or iodide (I), is reacted with a p-aminobenzoate compound having the Formula II to cause elimination of the halogen and a hydrogen of the p-amino group as hydrogen halide to form an N-allyl-p-aminobenzoate Compound III which is then reacted with a free halogen, i. e. chlorine or bromine (X'), to saturate the allyl group with halogen and form an N-(2,3-dihalopropyl)-p-aminobenzoate Compound IV. The latter compound is then condensed, preferably under the influence of a tertiary amine to react with the hydrogen halide formed, with 2,4,5-triamino-6-hydroxypyrimidine (V) to form the desired N-((2 - amino-4-hydroxy-6-pteridyl)methyl)-p-aminobenzoate compound. In the accompanying diagram, R', Z and n have the values given previously, X is from the group consisting of chlorine, bromine and iodine and X' is from the group consisting of chlorine and bromine.

Certain of the N-allyl-p-aminobenzoate compounds and the N-(2,3-dihalopropyl)-p-aminobenzoate compounds having the Formulas III and IV, respectively, have not been described previously. They can be represented by the generic formula

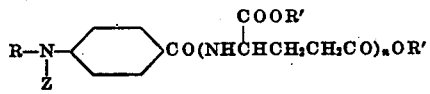

wherein R' and n have the values given previously, Z is a arylsulfonyl radical and R is from the group consisting of the allyl, 2,3-dichloropropyl and 2,3-dibromopropyl radicals.

As mentioned previously, p-aminobenzoate compounds having the Formula II which can be used in the process include those wherein n is zero, i. e. p-aminobenzoic acid, the arylsulfonyl-p-aminobenzoic acids and alkyl esters thereof, and also those wherein n is an integer from 1 to 7, inclusive, such as N'-(p-aminobenzoyl)-glutamic acid, N'-(p-aminobenzoyl)-gamma-glutamylglutamate, N'-(arylsulfonyl-p-aminobenzoyl)-gamma-glutamyl-gamma-glutamylglutamate and alkyl esters thereof.

The p-aminobenzoate compounds wherein n is an integer from the group 1 to 7 inclusive can be obtained in a number of ways, one of which is described and claimed in a concurrently filed co-pending application Serial No. 41,888. According to the method of the co-pending application a p-aminobenzoate compound having one glutamic acid residue in the molecule is prepared by reacting glutamic acid or an alkyl ester thereof with an arylsulfonyl-p-aminobenzoyl halide or with a p-nitrobenzoyl halide. The halides referred to in this connection are the chlorides and the bromides. When a p-nitrobenzoyl halide is used, an N'-(p-nitrobenzoyl)-glutamic acid or ester is first obtained which, upon reduction, e. g. with hydrogen using platinum oxide as a catalyst, yields an N'-(p-aminobenzoyl)-glutamic acid or ester. The latter compound can be converted readily by means of an arylsulfonyl halide to an N'-(arylsulfonyl-p-aminobenzoyl)-glutamic acid or ester. When an arylsulfonyl-p-aminobenzoyl halide is reacted with glutamic acid or its ester, an N'-(arylsulfonyl-p-aminobenzoyl)-glutamic acid or ester is formed directly. The latter compound can, if desired, be treated with hydrogen bromide and a bromine acceptor, such as phenol or catechol, in an aliphatic acid medium to split the arylsulfonyl radical from the molecule and form an N'-(p-aminobenzoyl)-glutamic acid or ester according to the method described and claimed in a concurrently filed co-pending application, Serial No. 41,883. Furthermore, the N'-(p-aminobenzoyl)-glutamic acid and the N'-(arylsulfonyl-p-aminobenzoyl)-glutamic acids can, if desired, be converted to the corresponding alkyl esters, e. g. by treatment with an alkanol and an esterification catalyst in known manner, or the esters can be hydrolyzed to the corresponding acids. In similar manner, other p-aminobenzoate compounds can be prepared having up to seven glutamic acid residues in the molecule by starting with the corresponding gamma-glutamylglutamic acids or esters containing the requisite number of peptide linkages.

The new intermediate compounds of the invention, i. e. the N-allyl-p-aminobenzoate compounds and the N-(2,3-dihalopropyl)-p-aminobenzoate compounds, wherein Z of Formulas III and IV is an arylsulfonyl radical are of particular value because of the protection afforded the aromatic amino group by the arylsulfonyl group. Compounds having the amino group thus protected are often not subject to decomposition and the formation of by-products when employed as a reactant to nearly the same extent as are compounds containing an unprotected amino group. Following the carrying out of a reaction using a compound containing such an arylsulfonylamino group, the arylsulfonyl radical can be split readily from the molecule formed by treating the compound with hydrogen bromide in an acetic or other aliphatic acid medium and in the presence of a bromine acceptor, such as phenol, to prevent bromination of the amine formed as described in the co-pending application Serial No. 41,883, mentioned previously.

The new intermediate compounds of the invention, as well as the N-((2-amino-4-hydroxy-6-pteridyl)methyl)-p-aminobenzoate compounds formed using the intermediates, wherein Z is an arylsulfonyl radical can also be converted to the corresponding non-sulfonyl compounds wherein Z is hydrogen by splitting the arylsulfonyl radical from the molecule in the manner just described.

The reaction of an allyl halide with a p-aminobenzoate compound is carried out conveniently by treating a mixture of the substances with an alkali. Alkalies which can be used, include sodium bicarbonate, dilute aqueous sodium hydroxide, aqueous sodium carbonate and many others. The use of too great an excess of too strong an alkali should be avoided when the p-aminobenzoate compound contains an ester radical to prevent hydrolysis of the ester radical unless such hydrolysis is desired. The reaction is generally carried out using an appreciable excess of the allyl halide and the mixture of substances is usually refluxed in alcohol or aqueous alcoholic solution for from several minutes to several hours. At the end of the refluxing period, the mixture can be diluted with water, the alcohol distilled and the residue extracted with benzene, ether or other water-immiscible solvent for the N-allyl-p-aminobenzoate compound. The N-allyl-p-aminobenzoate compounds are usually obtained as well defined crystalline solids and can be purified, if desired, by recrystallization from dilute ethanol or other suitable solvent.

The reaction of an N-allyl-p-aminobenzoate compound with a halogen is carried out conveniently by dissolving the N-allyl-p-aminobenzoate compound in a suitable organic liquid inert under the reaction conditions, e. g. in chloroform or carbon tetrachloride, and adding the halogen slowly to the cooled solution. Halogens which can be used are bromine and chlorine. Approximately equi-molecular quantities of reactants are generally employed. After the addition of the halogen is complete, the solvent can be vaporized and the N-(2,3-dihalopropyl)-p-aminobenzoate compound obtained as a residue which is often oily in nature in the case of esters, but generally solid in the case of the free acids. The compound is generally sufficiently pure for subsequent use without further purification, but can be purified further by distillation in high vacuum or, if a solid, by recrystallization.

Condensation of an N-(2,3-dihalopropyl)-p-aminobenzoate compound with 2,4,5-triamino-6-hydroxypyrimidine is effected with the aid of a tertiary amine, preferably a liquid heterocyclic tertiary amine, such as pyridine or quinoline, to react with the hydrogen halide formed. Other non-aromatic amines such as dibutyl amine, hexyl amine and morpholine can be used, if desired. The reaction is carried out conveniently by dissolving the substances in the dry liquid amine and allowing the mixture to stand for several hours, usually at ordinary room temperature. The mixture can then often be heated, e. g. on the steam bath, for a short time to advantage and the amine then volatilized under reduced pressure. The residue, consisting of the crude N-((2 - amino - 4 - hydroxy-6-pteridyl)methyl)-p-aminobenzoate compound can be purified by washing thoroughly with alcohol. Although the mechanism of the reaction is not completely understood, it has been found that complete aromatization of the heterocyclic ring system occurs with substantially complete conversion to the pteridine nucleus.

Hydrolysis, in the case of an ester, of an N-((2-amino-4 - hydroxy-6-pteridyl)methyl)-p-aminobenzoate compound to the corresponding acid can be effected readily by mixing the ester with dilute aqueous sodium hydroxide and warming the mixture, preferably under an inert atmosphere, for a short time. Upon filtering to remove insoluble matter and acidifying the filtrate, i. e. to a pH of about 4.3, the free acid separates in solid form and can be recovered by filtering and washing with alcohol or other suitable liquid.

The N-((2-amino - 4 - hydroxy - 6 - pteridyl)-methyl)-p-aminobenzoate compounds containing an arylsulfonyl radical can, if desired, be treated with hydrogen bromide and a halogen acceptor in an aliphatic acid medium, as described in the co-pending application Serial No. 41,883, previously referred to, to split the arylsulfonyl radical from the molecule and form the corresponding amino compound.

Although the invention has been described, in the case of compounds which are esters, with particular reference to the ethyl esters, it is understood that other alkyl esters, such as the methyl, propyl, iso-propyl, butyl, tert.-butyl, hexyl, nonyl and dodecyl esters, can be used with equal facility, if desired.

Although the invention is directed particularly, in case of esters of the glutamic acid residues, to alkyl esters, the process of the invention can also be carried out and corresponding compounds prepared using other esters, such as the phenyl, tolyl, xylyl, cyclohexyl, benzyl and many other aryl, aralkyl or cycloalkyl esters.

Arylsulfonyl compounds containing substantially any arylsulfonyl radical can be used in the process with the formation of the corresponding intermediate and final products. Arylsulfonyl radicals which may be present in the p-aminobenzoate compound and in the ensuing intermediate and final products are the benzenesulfonyl, p-toluene sulfonyl, o-toluenesulfonyl and naphthalenesulfonyl radicals as well as many others. Due to the ready availability and low cost of the p-toluenesulfonyl halides and to the higher yield of amine sometimes obtained when splitting a p-toluenesulfonyl compound than when splitting a compound containing the same amine but certain other arylsulfonyl radicals, compounds containing the p-toluenesulfonyl radical are preferred, but the invention is not limited thereto. It should be mentioned, furthermore, that the methods involved in the present invention can be carried out and corresponding compounds prepared using compounds wherein the arylsulfonyl group is replaced by an alkylsulfonyl, aralkylsulfonyl or cycloalkylsulfonyl groups, such as the methanesulfonyl, alphatoluenesulfonyl or cyclohexylsulfonyl groups, respectively.

Compounds similar to or identical with those of the folic acid group made by using the intermediates or method of the invention, such as pctroylglutamic acid and pteroyl-gamma-glutamyl-gamma-glutamylglutamic acid, which are of greatest value as measured by their biological activity against Lactobacillus casei or Streptococcus fecalis R, are those wherein the glutamic acid residues possess the same configuration as l(+)-glutamic acid and for this reason the preferred compounds of the invention are those having the same configuration. However, the invention also contemplates compounds having the dextro configuration as well as racemic mixtures.

Certain advantages of the invention are apparent from the following examples which are given by way of illustration only and are not to be construed as limiting.

*Example 1.—N'-(p-nitrobenzoyl)-l-glutamic acid*

Eighteen and one-half grams of p-nitrobenzoyl chloride was added over a period of 0.5 hour to a solution prepared by dissolving 18.5 grams of l(+)-glutamic acid hydrochloride in a suspension of 42 grams of sodium bicarbonate in 200 milliliters of water. After stirring at 40° to 45° C. for two hours, the solution was filtered, acidified and extracted with ether. The ether was evaporated and the residue crystallized from water. There was thus obtained 19.6 grams of N'-(p-nitrobenzoyl)-l-glutamic acid melting at 110° to 114° C. and having a specific rotation $$(\alpha)_D^{25} = -9.0°$$

The diethyl ester can be prepared by esterification of the acid with ethanol and hydrogen chloride or by reaction of p-nitrobenzoyl chloride with diethyl glutamate substantially as just described.

*Example 2.—N'-(p-aminobenzoyl)-l-glutamic acid*

N'-(p-nitrobenzoyl)-l-glutamic acid was dissolved in ethanol and reduced with hydrogen under a pressure of 40 pounds per square inch using platinum oxide as a catalyst. The reduced solution was filtered to recover platinum and evaporated to dryness. The residue consisted of a 70 per cent yield of crude N'-(p-aminobenzoyl)-l-glutamic acid melting at 156° to 163° C. Diethyl N'-(p-nitrobenzoyl)-l-glutamate can be reduced to diethyl N'-(p-aminobenzoyl)-l-glutamate in similar fashion.

*Example 3.—Diethyl N'-(p-toluenesulfonyl-p-aminobenzoyl)-l-glutamate*

A mixture of 407 grams of p-toluenesulfonyl-p-aminobenzoic acid and 3,450 milliliters of toluene was dried by distilling the mixture until 350 milliliters of distillate had been collected. A few drops of pyridine and 50 milliliters of thionyl chloride were then added to the dry toluene solution and the mixture stirred and refluxed for one-half hour. The solution was then cooled with agitation for two hours and the solid which precipitated was recovered by filtering and washing with toluene and then with mixed hexanes and drying. There was thus obtained 387 grams of p-toluenesulfonyl-p-aminobenzoyl chloride melting at 141° to 142° C.

A mixture of 48 grams of diethyl l(+)-glutamate hydrochloride, 68 grams of p-toluenesulfonyl-p-aminobenzoyl chloride, 19 grams of magnesium oxide, 250 milliliters of ethylene dichloride and 100 milliliters of water was stirred with cooling for about 4 hours. The mixture was filtered and the organic layer was separated from the filtrate and washed successively with water, ice cold dilute hydrochloric acid, water and dilute aqueous sodium bicarbonate. The washed organic layer was then dried and diluted with mixed hexanes until slightly turbid and allowed to crystallize. Upon filtering the mixture, there was obtained 78 grams of diethyl N'-(p-toluenesulfonyl-p-aminobenzoyl)-l-glutamate melting at 125° to 126° C. and having a specific rotation $(\alpha)_D^{25} = -13.2°$. The diester can be hydrolyzed readily with dilute sodium hydroxide to form N'-(p-toluenesulfonyl-p-aminobenzoyl)-l-glutamic acid.

*Example 4.—Ethyl N-allyl-p-aminobenzoate*

A mixture of 33 grams of ethyl p-aminobenzoate, 25 grams of sodium bicarbonate, 26 milliliters of allyl bromide, 200 milliliters of water and 300 milliliters of ethanol was refluxed for three hours, cooled and extracted with benzene. The benzene extract was concentrated and cooled whereupon ethyl N-allyl-p-aminobenzoate crystallized. The crystals which weighed 13.3 grams were recovered by filtering and recrystallized from dilute ethanol. The purified ethyl N-allyl-p-aminobenzoate melted at 58° to 60° C.

Anal. Calcd. for $C_{12}H_{15}O_2N$: C, 70.2; H, 7.4; N, 6.8. Found: C, 70.2; H, 7.6; N, 6.8.

Diethyl N'-(N-allyl-p-aminobenzoyl)-glutamate and N'-(N-allyl-p-aminobenzoyl)-glutamic acid are prepared in similar manner using diethyl N'-(p-aminobenzoyl)-glutamate and N'-(p-aminobenzoyl)-glutamic acid instead of ethyl p-aminobenzoate.

*Example 5.—Ethyl N-(allyl)-p-toluenesulfonyl-p-aminobenzoate*

A mixture of two grams of ethyl p-toluenesulfonyl-p-aminobenzoate, 1.3 milliliters of allyl bromide, 6.3 milliliters of normal aqueous sodium hydroxide and 15 milliliters of ethanol was refluxed for 90 minutes. The mixture was cooled and extracted with ether. The ethereal extract was extracted with five per cent sodium hydroxide solution and there was thus recovered 17 per cent of the sulfonyl compound in the form of p-toluenesulfonyl-p-aminobenzoic acid. The ether was then volatilized from the ethereal solution and the residue crystallized from dilute ethanol. There was thus obtained 1.54 grams of ethyl N-allyl-p-toluenesulfonyl-p-aminobenzoate melting at 84.5° to 85.5° C.

Anal. Calcd. for $C_{19}H_{21}O_4NS$: C, 63.5; H, 5.9; N, 3.9. Found: C, 63.6; H, 6.1; N, 3.5.

Diethyl N'-(N-(allyl)-p-toluenesulfonyl-p-aminobenzoyl)-glutamate and N'-(N-(allyl)-p-toluenesulfonyl-p-aminobenzoyl)-glutamic acid are prepared in similar manner using diethyl N'-(p-toluenesulfonyl-p-aminobenzoyl)-glutamate and N'-(p-toluenesulfonyl-p-aminobenzoyl)-glutamic acid, respectively, instead of ethyl p-toluenesulfonyl-p-aminobenzoate.

*Example 6.—Ethyl N-(2,3-dibromopropyl)-p-aminobenzoate*

Thirty-two one-hundredths gram of bromine was added to a solution of 0.4 gram of ethyl N-allyl-p-aminobenzoate in 10 milliliters of chloroform cooled in an ice bath. The mixture was allowed to stand for ten minutes and the chloroform then volatilized under reduced pressure. The residual, oily ethyl N-(2,3-dibromopropyl)-p-aminobenzoate was used without further purification.

In similar manner bromine is reacted with diethyl N'-(N-(allyl)-p-toluenesulfonyl-p-aminobenzoyl)-glutamate and N'-(N-(allyl)-p-toluenesulfonyl-p-aminobenzoyl)-glutamic acid to form diethyl N'-(N-(2,3-dibromopropyl)-p-toluenesulfonyl-p-aminobenzoyl)-glutamate and N'-(N-(2,3-dibromopropyl)-p-toluenesulfonyl-p-aminobenzoyl)-glutamic acid respectively.

In similar manner, also, diethyl N'-(N-(allyl)-p-aminobenzoyl)-glutamate and N'-(N-(allyl)-p-aminobenzoyl)-glutamic acid are reacted with bromine to form diethyl, N'-(N-(2,3-dibromopropyl)-p-aminobenzoyl)-glutamate and N'-(N-(2,3-dibromopropyl)-p-aminobenzoyl)-glutamic acid, respectively. The corresponding dichloro compounds are formed in similar fashion.

*Example 7.—Ethyl N-((2-amino-4-hydroxy-6-pteridyl)methyl)-p-aminobenzoate (ethyl pteroate)*

A mixture was prepared consisting of 365 milligrams of ethyl N-(2,3-dibromopropyl)-p-aminobenzoate, 5 milliliters of dry pyridine and 141 milligrams of 2,4,5-triamino-6-hydroxypyrimidine. The solution became deep purple upon standing overnight at room temperature. The mixture was then heated on a steam bath for twenty minutes and the pyridine was volatilized under reduced pressure. The residue was taken up in alcohol and the mixture centrifuged to recover the crude solid ethyl pteroate. The latter was mixed with 5 milliliters of normal aqueous sodium hydroxide, in which it was not completely soluble, and the mixture heated on the steam bath under an atmosphere of nitrogen for a few minutes. The solution was then allowed to stand at room temperature for about three hours and again heated on the steam bath for thirty minutes. The mixture was then filtered and the filtrate adjusted to pH 4.3, cooled, centrifuged and the solid washed three times with water, once with absolute ethanol and dried. There was thus obtained 50 milligrams of pteroic acid which stimulated the growth of *S. fecalis* R.

Diethyl pteroylglutamate and pteroylglutamic acid are prepared in similar manner using diethyl N'-(N-(2,3-dibromopropyl)-p-aminobenzoyl)-glutamate and N'-(N-(2,3-dibromopropyl)-p-aminobenzoyl)-glutamic acid, respectively.

In like manner, starting with N-(2,3-dibromopropyl)-p-toluenesulfonyl-p-aminobenzoic acid, N'-(N-(2,3-dibromopropyl)-p-toluenesulfonylp-aminobenzoyl)-glutamic acid or their alkyl esters instead of ethyl N-(2,3-dibromopropyl)-p-aminobenzoate, there are obtained N-((2-amino-4-hydroxy-6-pteridyl)methyl)-p-toluenesulfonyl-p-aminobenzoic acid, N'-(N-((2-amino-4-hydroxy-6-pteridyl)methyl)-p-toluenesulfonyl-p-aminobenzoyl)-glutamic acid and their alkyl esters, respectively.

We claim:

1. The method for forming a compound having the formula

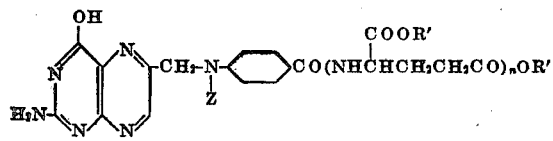

wherein R' is from the group consisting of hydrogen and the alkyl radicals, Z is from the group consisting of hydrogen and the arylsulfonyl radicals and n is from the group consisting of zero and the positive integer 1 which includes the step of subjecting a compound having the formula

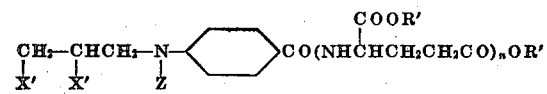

wherein X' is from the group consisting of chlorine and bromine and R', Z and n have the values given, to the action of 2,4,5-triamino-6-hydroxy-pyrimidine under the influence of sufficient of a tertiary amine to react with the hydrogen halide formed.

2. The method of claim 1 wherein the tertiary amine is pyridine.

3. The method of claim 1 wherein R' is an alkyl radical.

4. The method of claim 1 wherein n is the integer 1.

5. The method of claim 1 wherein n is zero.

6. The method of claim 1 wherein Z is hydrogen.

7. The method of claim 1 wherein Z is an arylsulfonyl radical.

8. The method of claim 1 wherein X' is bromine.

9. The method which includes: subjecting a compound having the formula

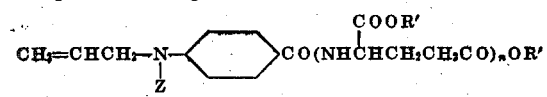

wherein R' is from the group consisting of hydrogen and the alkyl radicals, Z is from the group consisting of hydrogen and the arylsulfonyl radicals and n is from the group consisting of zero and the positive integer 1 to the action of a halogen from the group consisting of chlorine and bromine in an organic liquid medium inert under the reaction conditions to form a halogen-containing compound having the formula

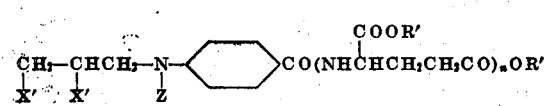

wherein X' is from the group consisting of chlorine and bromine; and subjecting the halogen-containing compound to the action of 2,4,5-triamino-6-hydroxypyrimidine under the influence of a tertiary amine to cause the formation of a compound having the formula

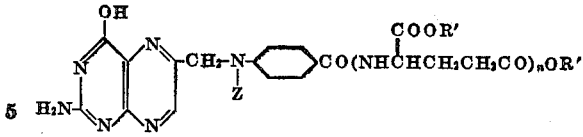

and separating the latter compound from the reaction mixture.

10. The method which includes: heating a mixture of an allyl halide from the group consisting of allyl bromide, allyl chloride and allyl iodide, an alkali and a compound having the formula

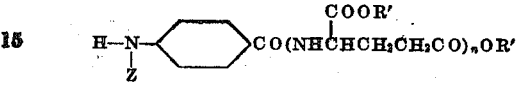

wherein R' is from the group consisting of hydrogen and the alkyl radicals, Z is from the group consisting of hydrogen and the arylsulfonyl radicals and n is from the group consisting of zero and the positive integer 1 to form an unsaturated compound having the formula

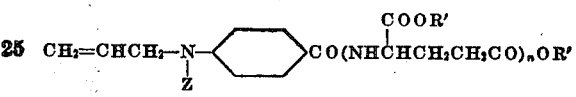

subjecting the unsaturated compound to the action of a halogen from the group consisting of chlorine and bromine in an organic liquid medium inert under the reaction conditions to form a halogen-containing compound having the formula

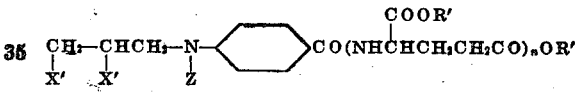

wherein X' is from the group consisting of chlorine and bromine; subjecting the halogen-containing compound to the action of 2,4,5-triamino-6-hydroxypyrimidine under the influence of a non-aromatic amine to cause the formation of a compound having the formula

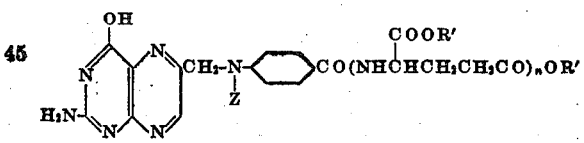

and separating the latter compound from the reaction mixture.

11. A compound having the formula

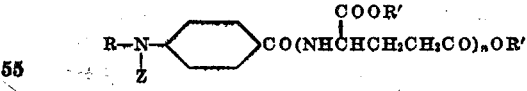

wherein R' is from the group consisting of hydrogen and the alkyl radicals, Z is an arylsulfonyl radical, n is from the group consisting of zero and the positive integer 1 and R is from the group consisting of the allyl, 2,3-dibromopropyl and 2,3-dichloropropyl radicals.

12. Ethyl N-(allyl)-p-toluenesulfonyl-p-aminobenzoate.

13. Ethyl N-(2,3-dibromopropyl)-p-toluenesulfonyl-p-aminobenzoate.

14. Diethyl N'-(N-(allyl)-p-toluenesulfonyl-p-aminobenzoyl)-glutamate.

DAVID I. WEISBLAT.
BARNEY J. MAGERLEIN.

REFERENCES CITED

The following references are of record in the file of this patent:

Lederle Bulletin, 13 (No. 3), 21 (1948).